United States Patent
Kim

(10) Patent No.: US 8,555,188 B2
(45) Date of Patent: Oct. 8, 2013

(54) METHOD OF CONTROLLING DEVICES USING WIDGET CONTENTS AND REMOTE CONTROLLER PERFORMING THE METHOD

(75) Inventor: Su-hyun Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 460 days.

(21) Appl. No.: 12/401,022

(22) Filed: Mar. 10, 2009

(65) Prior Publication Data

US 2010/0017736 A1   Jan. 21, 2010

(30) Foreign Application Priority Data

Jul. 16, 2008   (KR) .................. 10-2008-0069312

(51) Int. Cl.
*G06F 3/048* (2013.01)
*G06F 3/033* (2013.01)
*G06F 3/00* (2006.01)

(52) U.S. Cl.
USPC ........... 715/771; 715/718; 715/811; 715/835; 715/863

(58) Field of Classification Search
USPC ......... 715/774, 853, 708, 716, 718, 719, 762, 715/763, 767, 771, 810, 811, 825, 835, 715/863; 345/173, 176
See application file for complete search history.

(56) References Cited

U.S. PATENT DOCUMENTS

| | | | |
|---|---|---|---|
| 6,590,568 B1* | 7/2003 | Astala et al. ................. | 345/173 |
| 6,989,763 B2* | 1/2006 | Wall et al. .................. | 340/12.25 |
| 7,266,777 B2* | 9/2007 | Scott et al. .................... | 715/762 |
| 7,451,408 B2* | 11/2008 | Chan ............................ | 715/853 |
| 7,461,343 B2* | 12/2008 | Kates ............................ | 715/716 |
| 7,831,930 B2* | 11/2010 | Dresti et al. .................. | 715/835 |
| 2003/0151538 A1* | 8/2003 | Escobosa et al. ............. | 341/176 |
| 2006/0066716 A1* | 3/2006 | Chang ........................ | 348/14.05 |
| 2008/0165153 A1* | 7/2008 | Platzer et al. ................. | 345/173 |
| 2008/0178224 A1* | 7/2008 | Laude et al. .................... | 725/44 |
| 2009/0083411 A1* | 3/2009 | Takano et al. ................. | 709/224 |
| 2009/0161027 A1* | 6/2009 | Hardacker et al. ............ | 348/734 |

FOREIGN PATENT DOCUMENTS

KR   10-0513851 B1   9/2005

* cited by examiner

*Primary Examiner* — Omar Abdul-Ali
*Assistant Examiner* — Andrew Tank
(74) *Attorney, Agent, or Firm* — Sughrue Mion, PLLC

(57) ABSTRACT

Provided is a method of controlling devices by using a remote controller. The method includes downloading a widget program for the devices to the remote controller; generating control widget contents for controlling the devices using the widget program; displaying the control widget contents for controlling the devices at the remote controller; and controlling one of the devices according to a control command of a user that is input by using the displayed control widget contents.

22 Claims, 5 Drawing Sheets

METHOD OF CONTROLLING DEVICES USING WIDGET CONTENTS AND REMOTE CONTROLLER PERFORMING THE METHOD

CROSS-REFERENCE TO RELATED PATENT APPLICATIONS

This application claims priority from Korean Patent Application No. 10-2008-0069312, filed on Jul. 16, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to controlling devices with a remote controller, and more particularly, to a method of controlling devices using widget contents and a remote controller performing the method.

2. Description of the Related Art

As digital technologies have developed, a variety of devices such as digital televisions (TV), computers, audio devices, and air conditioners have become widely used. A user can use these devices by manipulating them himself/herself or by controlling them by using a remote controller. When the user presses a button of the remote controller, an electronic circuit chip included in the remote controller interprets an electrical data signal corresponding to the button pressed by the user, changes a control signal corresponding to the electrical data signal into a light signal by using an infrared light emitting diode (LED), and transmits the light signal to a device. Devices perform specific operations by determining signals input from the remote controller.

An integrated remote controller has been developed to control a plurality of devices by using one remote controller. The integrated remote controller includes intrinsic information allocated to each device manufacturer or each device. Thus, when a user presses a predetermined button of the remote controller so as to control a specific device of a specific manufacturer, the remote controller displays a unique key code allocated to the specific device of the specific company and transmits the unique key code together with a control signal to the specific device. The device having the key code transmitted by the remote controller, from among the plurality of devices, performs a specific function requested by the user according to the control signal transmitted by the remote controller.

SUMMARY OF THE INVENTION

The present invention provides a method of controlling devices using widget contents and a remote controller performing the method.

According to an aspect of the present invention, there is provided a method of controlling devices performed by a remote controller, the method including: downloading a widget program for the devices; displaying control widget contents for controlling the devices, which are generated by using the widget program; and controlling the devices according to a user's control commands that are input by using the displayed control widget contents.

The downloading of the widget program may include downloading the widget program from one selected from among a server, a memory, and the devices.

The controlling of the devices may include controlling the devices by using a radio frequency (RF) communication method or an infrared ray communication method, and the method may further include identifying a device to be controlled and registering the device before controlling the devices. In addition, the controlling of the devices may include controlling each of the devices independently according to control commands that are input by using the control widget contents that are generated for controlling each of the devices when a plurality of devices are controlled. The control widget contents may include at least one button, and the displaying of the control widget contents may include adding or deleting one or more of the control widget contents and the button included in the control widget contents or changing the position of one or more of the control widget contents and the button included in the control widget contents. The changing of the position of one or more of the control widget contents and the button may include: inputting a touch and drag signal from the user; and changing the position of the control widget contents that are displayed according to the input and the position of the button included in the control widget contents. The changing of the position of one or more of the control widget contents and the button may include, when a plurality of control widget contents are displayed, displaying the plurality of control widget contents overlapping control widget contents for other devices. The control widget contents may include comprise at least one button, and the method may further include: downloading a widget edition program for editing the control widget contents; and editing one or more of the control widget contents and the button included in the control widget contents by using the widget edition program. The editing of one or more of the control widget contents and the button included in the control widget contents may include editing at least one of color, size, and shape of one or more of the button and the control widget contents. The editing of one or more of the control widget contents and the button included in the control widget contents may include: editing one or more of the control widget contents and the button for each of the users according to edition commands that are received for each of the users; and storing a screen containing one or more of the control widget contents that are edited for each of the users and the button together with an identifier for identifying the users.

According to another aspect of the present invention, there is provided a remote controller performing a method of controlling devices, the remote controller including: a widget manager generating control widget contents for controlling the devices by using a widget program for the devices; a display unit displaying the control widget contents; a user interface to which control commands for the devices are input by using the displayed control widget contents; a controller generating control signals for the devices according to the control commands for the devices; and a communication unit downloading the widget program and transmitting the control signals to the devices.

According to another aspect of the present invention, there is provided a computer readable recording medium having recorded thereon a program for executing the method of controlling devices performed by a remote controller, the method including: downloading a widget program for the devices; displaying control widget contents for controlling the devices, which are generated by using the widget program; and controlling the devices according to a user's control commands that are input by using the displayed control widget contents.

According to another aspect of the present invention, there is provided a method controlling a device, the method including: downloading a widget program to a remote controller; generating, at the remote controller, control widget contents for controlling a device, using the widget program; displaying the control widget contents on a screen of the remote controller; receiving a control command that is input using the displayed control widget contents; and transmitting to the device a wireless signal to control the device according to the control command.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
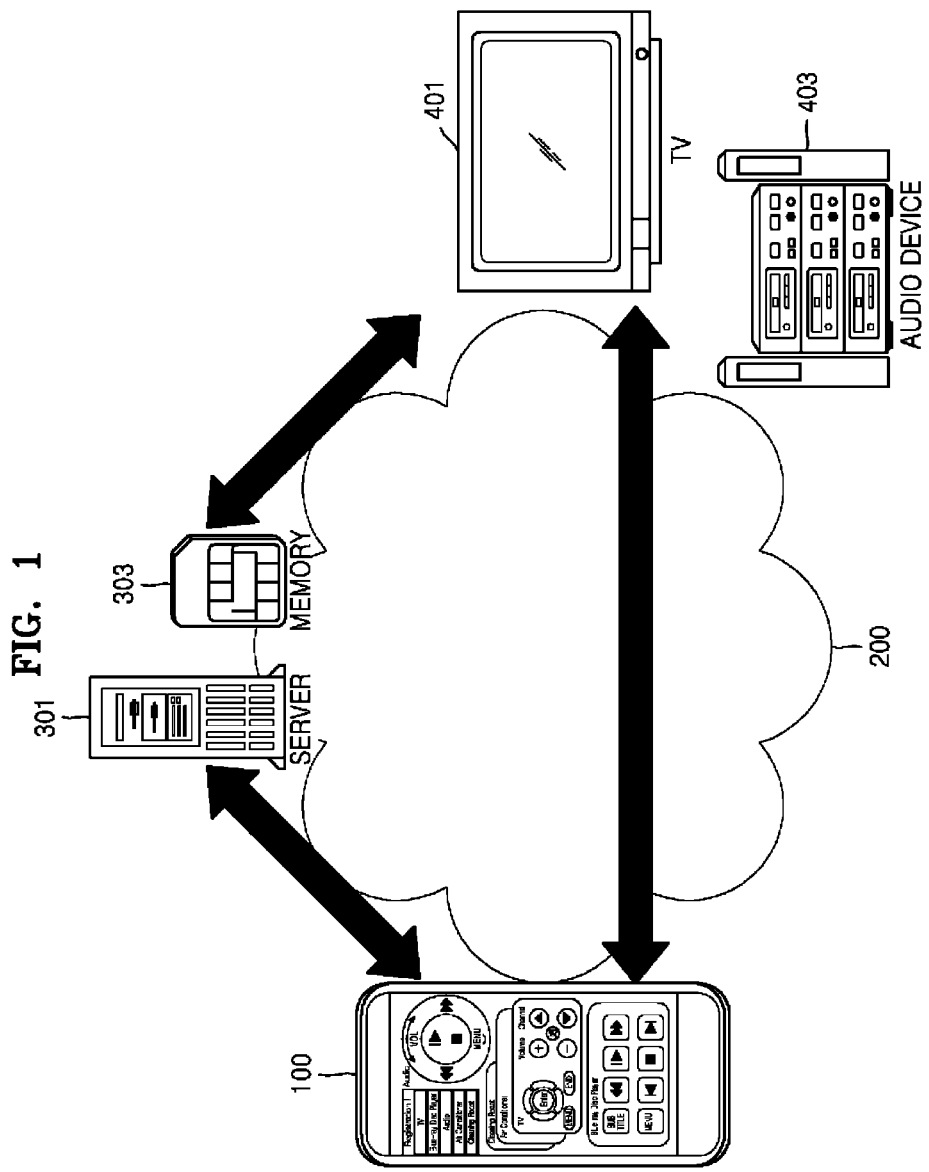
FIG. 1 illustrates a remote controller and a method of controlling devices by using the remote controller according to an exemplary embodiment of the present invention.

FIG. 1 illustrates a remote controller and a method of controlling devices by using the remote controller according to an exemplary embodiment of the present invention. Referring to FIG. 1, a remote controller 100 is linked to a server 301, a memory 303, and devices 401 and 403 via a communication network 200.

The remote controller 100 according to the current exemplary embodiment of the present invention controls a variety of types of devices by using a remote control method and displays widget contents and controls the devices 401 and 403 according to a user's control commands that are input by using the widget contents.

The devices 401 and 403 comprise a variety of types of devices that are controlled by using a remote control method, such as a TV and an audio device. Although the TV and the audio device are illustrated in FIG. 1, the present invention is not limited to this and the devices 401 and 403 may be any products that require remote control, such as a set top box, an air conditioner, a projector, etc.

A widget is a small graphical user interface (GUI) which operates an application program on a computer operating system and displays a result of operating the application program on a screen. In other words, a widget is a driving method by which functions provided by a web browser such as Internet explorer are provided without opening the web browser, like windows that display information transmitted from the Internet on a screen.

The remote controller 100 downloads a widget program and generates a variety of types of widget contents by using the downloaded widget program. The widget contents may include a clock, a calendar, a memo note, a map, news, an e-mail, a search window, etc. In addition, the widget contents according to the present invention include control widget contents for controlling the devices 401 and 403. The control widget contents are used to control functions allocated to each of the devices 401 and 403. For example, when the device 401, which a user wants to control, is a TV and the control widget contents are widget contents for controlling the TV, the user may manipulate buttons of the control widget contents displayed on the screen to control the TV so that various functions of the TV, such as channel change, volume change, recording, etc. can be performed.

The remote controller 100 according to the current exemplary embodiment of the present invention comprises an integrated remote controller which controls the devices 401 and 403 in an integrated manner. When a plurality of devices 401 and 403 are controlled, the remote controller 100 may generate control widget contents that are used to control each of the devices 401 and 403 and may control each of the devices 401 and 403 by using the control widget contents for each of the devices 401 and 403. In this case, the control widget contents for the devices 401 and 403 are independent.

The communication network 200 comprises a wired or wireless communication network 200. The remote controller 100 may download a widget program or a widget edition program by using an infrared ray communication technology, a local area wireless communication technology, etc. The infrared ray communication technology may include an infrared data association (IrDA)-based infrared ray communication method and a radio frequency (RF) communication method. In the infrared ray communication method, the remote controller 100 has a simple structure and low power consumption. However, the remote controller 100 operates in a direction in which users face each other at a short distance and communication is not possible if there is any obstacle therebetween. On the other hand, an RF-based local area wireless communication technology operates in all directions and is not affected by obstacles. An RF wireless communication method may utilize wireless LAN (WLAN), Bluetooth, Zigbee, WiBro, or radio frequency identification (RFID) technology capable of recognizing an object by identifying a unique ID by using an electric wave. The remote controller 100 downloads the widget program or the widget edition program according to a wired or wireless communication method.

The server 301 may be provided by the manufacturer of the devices 401 and 403 or by a contents provider who generates a widget program of the devices 401 and 403 and sells the widget program. The widget program and the widget edition program of the devices 401 and 403 are stored in the server 301.

The manufacturer of the devices 401 and 403 may manufacture the widget program and the widget edition program, may upload them on the server 301 or may store them in the memory 303 and may provide them to a purchaser of the devices 401 and 403. The remote controller 100 generally does not include a browser such as Internet explorer. As occasion demands, when the remote controller 100 has a browsing function, the remote controller 100 may directly download the widget program and the widget edition program from the server 301 by accessing the server 301. When the remote controller 100 has no browsing function, the user may download the widget program and/or the widget edition program stored in the memory 303 on the remote controller 100 by using the memory 303 supplied by the manufacturer of the devices 401 and 403.

Internet access is possible when the devices 401 and 403 have a browsing function, and data can be stored when a memory is included in the devices 401 and 403. In addition, when the devices 401 and 403 have a universal serial bus (USB) function, for example, when the TV 401 is an Internet protocol (IP) TV, the user may download the widget program and the widget edition program by accessing the server 301 by using the IP TV 401. In this case, the user may download the widget program etc. from the IP TV 401 by allowing the remote controller 100 to access the IP IV 401.

The remote controller 100 generates control Widget contents for controlling the devices 401 and 403 by using the downloaded Widget program and displays the control widget contents on a screen. The user may select the desired devices 401 and 403 by using the control widget contents displayed on the screen of the remote controller 100 and may control the desired devices 401 and 403. When the widget edition program is downloaded on the remote controller 100, the user may also edit the control widget contents displayed on the screen of the remote controller 100. According to the current exemplary embodiment of the present invention, the user may generate the control widget contents of the desired devices 401 and 403 so that a customized remote controller can be provided to the user. In addition, the user may readily control the devices 401 and 403 by using the widget contents.

Figure 2:
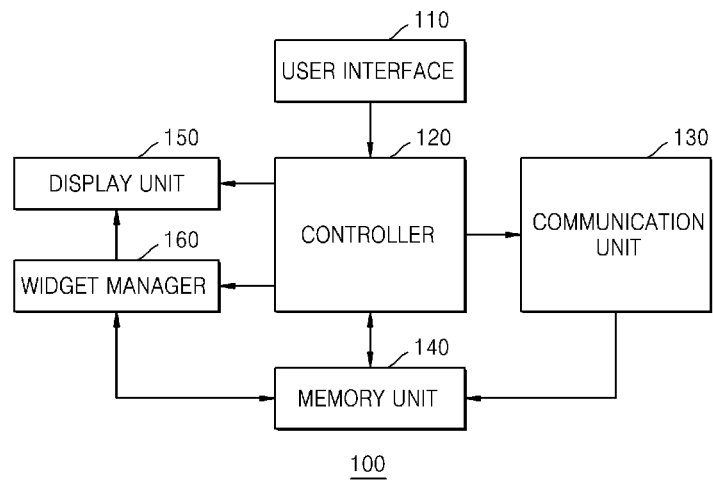
FIG. 2 is a block diagram of the remote controller of FIG. 1.

FIG. 2 is a block diagram illustrating the remote controller 100 of FIG. 1. Referring to FIG. 2, the remote controller 100 comprises a user interface 110, a controller 120, a communication unit 130, a memory unit 140, a display unit 150, and a widget manager 160.

The user interface 110 acts as an interface with the user and transmits the user's commands to the controller 120. The user interface 110 comprises a physical transducer such as a keyboard, a mouse, a microphone or the like and transmits commands, characters, numbers, audio data, etc. from the user to the controller 120. In addition, the user interface 110 comprises a touch screen and may recognize a voltage difference due to a touch as control commands. According to the exemplary embodiment, the user may input commands for moving the position of the control widget contents or the position of a button included in the control widget contents or for changing the color or size of the button by using the user interface 110. In addition, the user may transmit control commands to the desired devices 401 and 403 by using the user interface 110. The user may also use a touch and drag method.

The controller 120 controls the overall operation of the remote controller 100 according to a user's request by using the user interface 110. The controller 120 controls the widget manager 160 and the display unit 150 and allows the control widget contents to be generated and to be displayed. In addition, when the user presses the button included in the remote controller 100, the controller 120 interprets an input signal and generates a control signal corresponding to the input signal. In other words, the controller 120 searches for and displays a key code stored in the memory unit 140, converts the key code into control signals that can be transmitted to the devices 401 and 403, and transmits the control signals to the specific devices 401 and 403. In the case that the remote controller 100 is an integrated remote controller, the controller 120 searches for unique key codes respectively allocated to the devices 401 and 403 and transmits the key code together with the control signal to the device that is selected by the user. The controller 120 comprises an arithmetic logic unit (ALU) for performing calculation and a register for temporarily storing data and commands.

The communication unit 130 downloads the widget contents and the widget edition program from the server 301, the memory 303, the device 401 or 403 via the wired or wireless communication network 200 and transmits the control signals that are generated according to the user's control commands, to the device to be controlled by the user. In the case that the communication unit 130 communicates by using a wireless communication method, the communication unit 130 may comprise a wireless signal transceiver (not shown), a base band processor (not shown), and a link controller (not shown). The base band processor and the link processor are connected to the controller 120 by using a host control interface (HCI) and transmit and receive an HCI packet to and from the controller 120, thereby exchanging the control commands and transmission/reception data. The wireless communication method may include a WLAN, Bluetooth, Zigbee, WiBro, etc.

Although the communication unit 130 is illustrated as one block in FIG. 2, the communication unit 130 may be divided into two blocks as occasion demands. In other words, the communication unit 130 may be divided into a communication unit for performing a function of downloading the widget contents and the widget edition program and a communication unit for performing a function of transmitting the control signals to the devices 401 and 403. In this case, the communication unit 130 that is divided into two communication units may perform wired or wireless communication according to an independent communication method. After downloading the widget program or the widget edition program according to the wired or wireless communication method, the remote controller 100 may give control commands to the devices 401 and 403 by using a different method from a communication method that is used to download the widget program or widget edition program.

A local area wireless communication technology using an RF communication technology operates in all directions and is not affected by obstacles. Thus, when the user wants to control the devices 401 and 403 by using the local area wireless communication technology and when a plurality of the same devices are used, control commands to the devices 401 and 403 need to be differentiated. This is because, for example, when there is a neighboring audio device of the same model manufactured by the same company as the audio device 403 to be controlled by the user and when the user gives control commands to the device 403 by using the local area communication technology, the neighboring audio device may be controlled. To this end, the communication unit 130 may perform registration, i.e., pairing, which identifies a device to be controlled before control commands are given to the devices 401 and 403 by using the RF communication method.

The memory unit 140 stores programs etc., which are necessary to display the widget contents. The memory unit 140 may include a high-speed main memory which is a storage medium type such as random access memory (RAM) or read only memory (ROM), auxiliary memory which is a long-term storage medium type such as floppy disks, hard disks, tapes, CD-ROMs or flash memory, and a device for storing data by using electricity, magnetism, optics or other storage mediums. The widget program or the widget edition program, and the widget contents that are generated by the widget program may be stored in the memory unit 140.

When the user edits the control widget contents, the memory unit 140 may store a screen containing the edited control widget contents. When a plurality of users use one remote controller 100, the widget contents that are edited for each user may also be stored in the memory unit 140 for each users. In this case, a user identifier which indicates a user of a screen to be stored may be stored together in the memory unit 140. In addition, a key code which is necessary to convert the user's control commands into control signals to be transmitted to the devices 401 and 403, is stored in the memory unit 140. When the remote controller 100 is an integrated remote controller which controls a plurality of devices manufactured by a plurality of companies, the memory unit 140 stores a unique key code allocated to a specific device of a specific company.

The display unit 150 displays the overall state of the remote controller 100 or the widget contents that are generated by the widget program. The display unit 150 may comprise an on-screen display (OSD) processor (not shown) which generates and displays a user terminal control list etc. In FIG. 2, the display unit 150 is illustrated as a separate block from the user interface 110. However, as occasion demands, the display unit 150 may also perform the function of the user interface 110. The user may edit the widget contents that are displayed on the display unit 150 or may move the position of the widget contents or the position of a button included in the widget contents or may perform the function of hiding a predetermined button or displaying the button again. In addition, the user may give control commands to desired devices by using the widget contents.

The widget manager unit 160 generates the control widget contents by executing the widget program. As occasion demands, the widget manager unit 160 may perform the function of editing the control widget contents or buttons included in the control widget contents by executing the widget edition program. The widget manager unit 160 may add or delete the widget contents or may move the position of the widget contents according to a user's request. As occasion demands, when a plurality of control widget contents are displayed, they may be displayed overlapping control widget contents for other devices. The widget manager 160 may edit the color, size, shape, etc. of the control widget contents by using the widget edition program. In the remote controller according to the current exemplary embodiment of the present invention, the user may set a screen of the remote controller 100 as desired. In addition, a desired display screen may be set according to a plurality of users.

Figure 3:
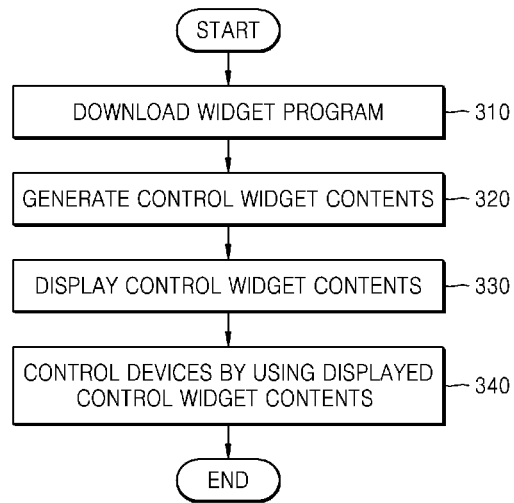
FIG. 3 is a flowchart illustrating a method of controlling devices, according to an exemplary embodiment of the present invention.

FIG. 3 is a flowchart illustrating a method of controlling devices, according to an exemplary embodiment of the present invention. Referring to FIG. 3, the remote controller 100 may download a widget program from one selected from among the server 301, the memory 303, the device 401 or the device 403 in operation 310. The widget manager 160 generates control widget contents by executing the widget program in operation 320 and displays the control widget contents in operation 330. According to the present invention, the remote controller 100 comprises an integrated remote controller. Thus, when a plurality of devices are controlled, the remote controller 100 may download the widget program for controlling each of the devices and may generate control widget contents corresponding to the number of the devices. In this case, the control widget contents for each of the devices are different from control widget contents for other devices. Thus, a user may control a plurality of devices independently by using a plurality of control widget contents.

The control widget contents are used to control specific devices and may comprise one or more buttons. The user may hide unused control widget contents or a button of the control widget contents or the buttons included in the control widget contents that are displayed on the screen or may delete them or may display the hidden control widget contents or buttons again. When a plurality of devices are controlled and control widget contents are generated for a plurality of devices, the user may also display the control widget contents overlapping control widget contents for other devices. In addition, the user may also move the position of the control widget contents or the position of the button included in the control widget contents. To this end, the user may use a touch and drag method.

The user may control devices by selecting a desired function by using the displayed control widget contents in operation 340. When the remote controller 100 controls the devices by using an RF communication method and the devices to be controlled are a plurality of the same products manufactured by the same company, the user may select a device to be controlled from among the plurality of devices and may register the selected device and then may control the device. When the user selects a desired function by using the button included in the control Widget contents, the remote controller 100 extracts a key code corresponding to a user's commands, converts the key code into a control signal, and transmits the control signal to the device.

Figure 4:
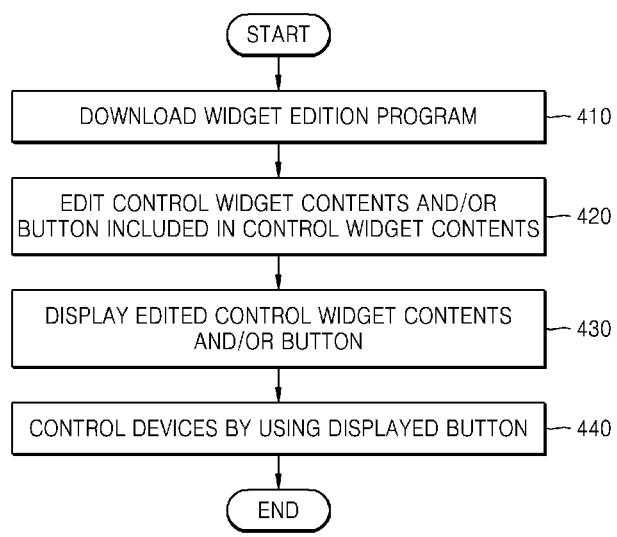
FIG. 4 is a flowchart illustrating a method of controlling devices, according to another exemplary embodiment of the present invention.

FIG. 4 is a flowchart illustrating a method of controlling devices, according to another exemplary embodiment of the present invention. Referring to FIG. 4, the remote controller 100 may download a widget edition program for editing widget contents from one selected from among the server 301, the memory 303, the device 401 or the device 403 in operation 410. The widget edition program provides a function of editing the control widget contents and the button included in the control widget contents. In addition, the widget edition program provides a function of editing the control widget contents and the button included in the control Widget contents for each user. The user may edit the control widget contents and/or the button included in the control widget contents by using the widget edition program in operation 420. The user may edit at least one of the color, shape or size of the control widget contents or the button included in the control widget contents. In addition, when a plurality of users use the remote controller 100, the control widget contents and the button included in the control widget contents that are edited for each user may be stored. The remote controller 100 displays the edited control widget contents and/or button included in the control widget contents in operation 430. The user may control the devices by using the displayed button in operation 440.

Figure 5A:
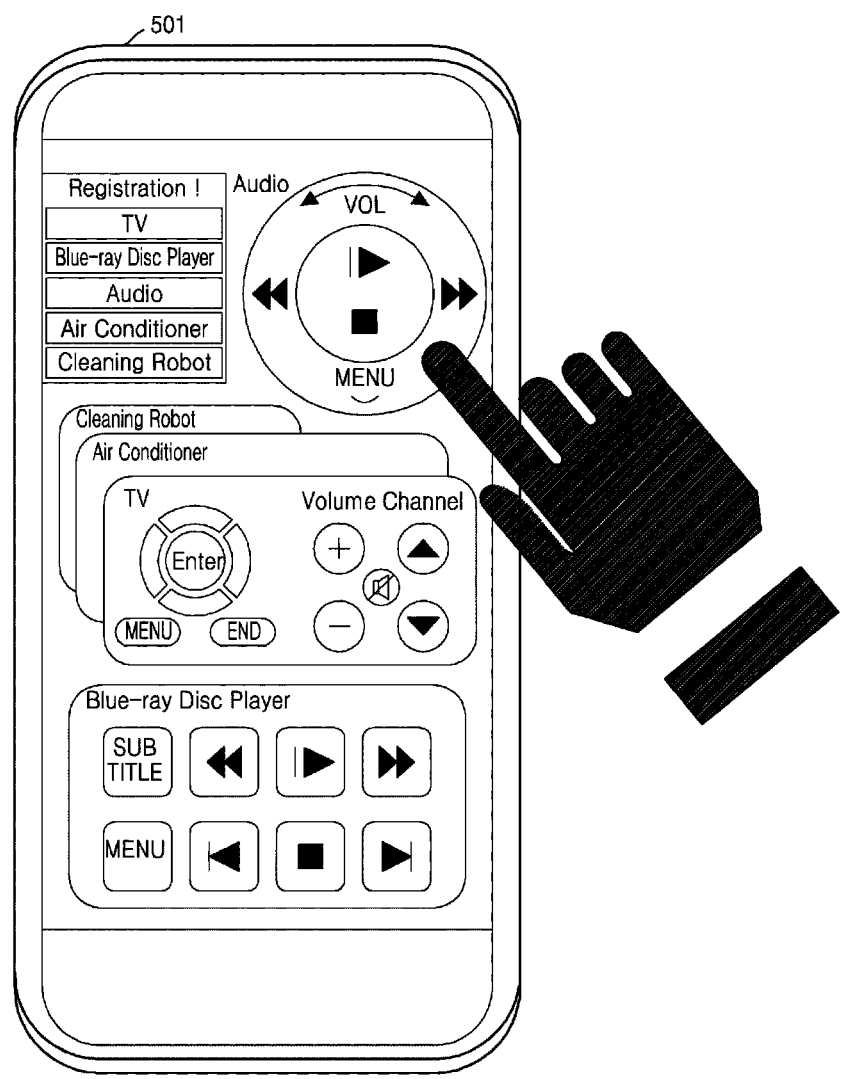
FIGS. 5A and 5B illustrate a method of controlling devices in view of a graphical user interface (GUI).
Figure 5B:
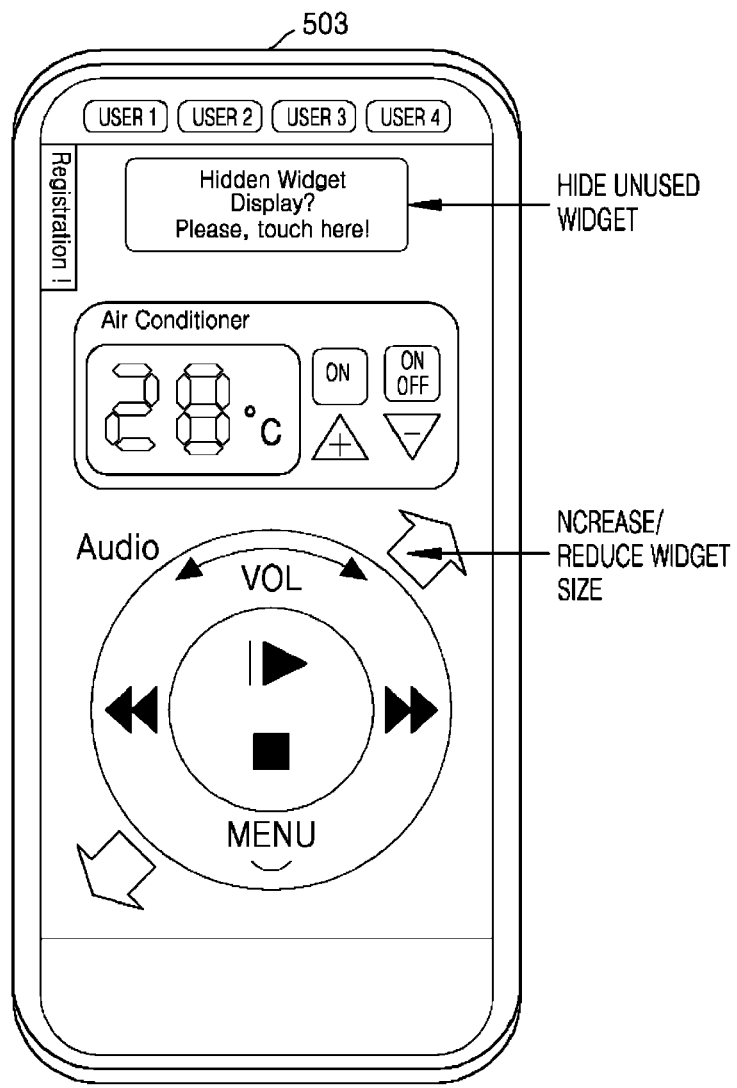

FIGS. 5A and 5B illustrates a method of controlling devices in view of a graphical user interface (GUI). The screen 501 of the remote controller 100 shown in FIG. 5A and the screen 503 of the remote controller 100 shown in FIG. 5B indicate display the widget contents that are generated by the widget program. A plurality of control widget contents that are generated for a plurality of devices, i.e., a TV, a Blu-ray disc player, an audio device, an air conditioner, and a cleaning robot, are displayed on the screen 501 of FIG. 5A. The user may edit the control widget contents or the button included in the control widget contents by using a touch and drag method etc. When the user gives a command to display the control widget contents for a specific device, as overlapping control widget contents for other devices, the remote controller 100 may allow control widget contents for a TV to be displayed on control widget contents for a cleaning robot or an air conditioner, as displayed on the screen 501 of FIG. 5A.

When the user gives a command to hide control widget contents for other devices excluding control widget contents for an audio device and an air conditioner, so as to control the audio device and the air conditioner, the remote controller 100 may allow the control widget contents for an audio device and an air conditioner to be displayed on the screen and may allow the control widget contents for other devices to be hidden, as displayed on the screen 503 of FIG. 5B. When receiving a command to increase the size of the control widget contents for an audio device from the user, the remote controller 100 may increase the size of the control widget contents for an audio device, as displayed on the right screen 503 of FIG. 5B. In addition, when a plurality of users use the remote controller 100, the remote controller 100 may store the control widget contents that are edited for each of the users. The user may select a desired button from among buttons USER 1 to USER 4 displayed on the top end of the right screen 503 of FIG. 5B to use the control widget contents that are edited for each of the users.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling devices performed by a remote controller, the method comprising:
   downloading a widget program for the devices to the remote controller;
   displaying control widget contents for controlling the devices, which are generated at the remote controller by using the widget program, each of the control widget contents correspond to one device from among the devices; and
   controlling the devices according to a control commands that are input by using the displayed control widget contents,
   wherein the control widget contents are used to control functions allocated to each of the devices to perform functions of the devices, and wherein each of the devices is associated with different control widget contents for controlling each device independently of the other devices,
   wherein a position of the control widget contents is modifiable by touching and dragging the control widget contents,
   wherein the control widget contents comprise at least one button, and the displaying the control widget contents comprises adding or deleting at least one of the control widget contents and the button included in the control widget contents or changing a position of at least one of the control widget contents and the button included in the control widget contents, and
   wherein each respective control widget contents can be independently resized and wherein if the control widget contents are not used, the control widget contents can be at least partially hidden.

2. The method of claim 1, wherein the downloading the widget program comprises downloading the widget program from one of a server, a memory, and the devices.

3. The method of claim 1, wherein the controlling the devices comprises controlling the devices by using radio frequency communications or infrared ray communications,
   the method further comprising, before controlling the devices, identifying a device to be controlled and registering the device.

4. The method of claim 1, wherein the controlling the devices comprises controlling each of the devices independently according to control commands that are input by using the control widget contents that are generated for controlling each of the devices when a plurality of devices are controlled.

5. The method of claim 1, wherein the changing the position of the at least one of the control widget contents and the button comprises:
   inputting a touch and drag signal; and
   changing the position of the control widget contents that are displayed according to the touch and drag signal and the position of the button included in the control widget contents.

6. The method of claim 5, wherein the changing the position at least one of one of the control widget contents and the button comprises, when a plurality of control widget contents are displayed, displaying the plurality of control widget contents overlapping control widget contents for other devices.

7. The method of claim 1, wherein the control widget contents comprise at least one button,
   the method further comprising:
   downloading a widget edition program for editing the control widget contents; and
   editing at least one of the control widget contents and the button included in the control widget contents by using the widget edition program.

8. The method of claim 7, wherein the editing the at least of one of the control widget contents and the button included in the control widget contents comprises editing at least one of color, size, and shape of the at least one of the button and the control widget contents.

9. The method of claim 8, wherein the editing the at least one of the control widget contents and the button included in the control widget contents comprises:
   editing the at least one of the control widget contents and the button for each of the users according to edition commands that are received for each of a plurality of users; and
   storing a screen containing at least one of the control widget contents that are edited for each of the users and the button together with an identifier for identifying the users.

10. A remote controller comprising:
   a widget manager which generates control widget contents for controlling a plurality of devices by using a widget program for the devices;
   wherein the control widget contents are used to control functions allocated to each of the devices to perform functions of the devices, and wherein each of the devices is associated with different control widget contents for controlling each device independently of the other devices,
   a display unit which displays the control widget contents, wherein each of the control widget contents correspond to one device from among the devices;
   a user interface through which control commands for the devices are input by using the displayed control widget contents;
   a controller which generates control signals for the devices according to the control command; and
   a communication unit which downloads the widget program and transmits the control signals to the devices,
   wherein a position of the control widget contents is modifiable by touching and dragging the control widget contents,
   wherein the control widget contents comprise at least one button, and the widget manager adds or deletes at least one of the control widget contents and the button included in the control widget contents or changes a position of the at least one of the control widget contents and the button included in the control widget contents, and the display unit displays the at least one of the control widget contents and the button that is added or deleted or has changed position, and wherein each respective control widget contents can be independently resized and wherein if the control widget contents are not used, the control widget contents can be at least partially hidden.

11. The remote controller of claim 10, wherein the communication unit downloads the widget program from one of a server, a memory, and the devices.

12. The remote controller of claim 10, wherein the controller identifies and registers the devices, and the communication unit transmits the control signal to the devices by using radio frequency (RF) communication or infrared ray communication.

13. The remote controller of claim 10, wherein the controller controls each of the devices independently according to control commands that are input by using the control widget contents that are generated for each of the devices when a plurality of devices are controlled.

14. The remote controller of claim 10, wherein a touch and drag signal is input through the user interface, and the widget manager changes the position of the control widget contents that are displayed according to the touch and drag signal input and the position of the button included in the control widget contents.

15. The remote controller of claim 14, wherein, when a plurality of control widget contents are displayed, the widget manager displays the plurality of control widget contents overlapping control widget contents for other devices, and the display unit displays the plurality of overlapping control widget contents.

16. The remote controller of claim 10, wherein the control widget contents comprise at least one button, and the communication unit downloads a widget edition program for editing the control widget contents, and the widget manager edits at least one of the control widget contents and the button included in the control widget contents by using the widget edition program.

17. The remote controller of claim 16, wherein the widget manager edits at least one of color, size, and shape of at least one of the button and the control widget contents.

18. The remote controller of claim 17, further comprising a memory unit in which information for generating the control signals by using the control commands is stored, wherein the widget manager edits at least one of the control widget contents and the button for each of a plurality of users according to edition commands that are received for each of the users; and the memory unit stores a screen containing at least one of the control widget contents that are edited for each of the users and the button together with an identifier for identifying the users.

19. A computer readable recording medium having recorded thereon a program for executing the method of claim 1.

20. A method controlling a plurality of devices, the method comprising:
    downloading a widget program to a remote controller;
    generating, at the remote controller, control widget contents for controlling the devices, using the widget program;
    wherein the control widget contents are used to control functions allocated to each of the devices to perform functions of the devices, and wherein each of the devices is associated with different control widget contents for controlling each device independently of the other devices,
    displaying the control widget contents on a screen of the remote controller, wherein each of the control widget contents correspond to one device from among the devices;
    receiving a control command that is input using the displayed control widget contents; and
    transmitting to the device a wireless signal to control the devices according to the control command,
    wherein a position of the control widget contents is modifiable by touching and dragging the control widget contents,
    wherein the control widget contents comprise at least one button, and the displaying the control widget contents comprises adding or deleting at least one of the control widget contents and the button included in the control widget contents or changing a position of at least one of the control widget contents and the button included in the control widget contents, and
    wherein each respective control widget contents can be independently resized and wherein if the control widget contents are not used, the control widget contents can be at least partially hidden.

21. The method according to claim 20, wherein the control widget contents are displayed as a graphical user, interface on the screen of the remote controller.

22. The method of claim 20, wherein the generating comprises generating a plurality of independent control widget contents for controlling the plurality of devices, respectively, using the widget program,
    the method further comprising:
    selecting one of the plurality of devices to be controlled by using the displayed control widget contents.

* * * * *